May 9, 1950 L. JACOBI 2,506,671
POWER TRANSMITTING MECHANISM
Filed April 29, 1946 2 Sheets-Sheet 1

INVENTOR
Louis Jacobi
BY
ATTORNEY

May 9, 1950 L. JACOBI 2,506,671
POWER TRANSMITTING MECHANISM
Filed April 29, 1946 2 Sheets-Sheet 2

INVENTOR
Louis Jacobi
BY
ATTORNEY

Patented May 9, 1950

2,506,671

UNITED STATES PATENT OFFICE 2,506,671

POWER TRANSMITTING MECHANISM

Louis Jacobi, West Allis, Wis., assignor to Allis-Chalmers Manufacturing Company, Milwaukee, Wis., a corporation of Delaware Application April 29, 1946, Serial No. 665,697

10 Claims. (Cl. 74—700)

This invention relates to power transmitting mechanisms, and it is concerned more particularly with a transmission unit for use in motor vehicles where it may serve to transmit power from the vehicle motor, at different gear ratios, to the drive gearing for the ground engaging propelling elements of the vehicle, and also to transmit power from the vehicle motor to external machinery such as mobile equipment which may be mounted on or hitched to the vehicle, or stationary equipment which may be set up separately from the vehicle.

Transmission units of the hereinabove mentioned character have heretofore been used, particularly in connection with tractors, and in such units as heretofore constructed a change speed transmission mechanism and a power take-off mechanism have been incorporated in such relation to each other that the change speed transmission mechanism could be made effective to transmit power from the vehicle motor, at various gear ratios, to the drive gearing for the ground engaging propelling elements of the vehicle, and so that the power take-off mechanism could be made effective to transmit power from the vehicle motor to external machinery irrespective of whether or not driving power from the vehicle motor is transmitted to the propelling elements of the vehicle through the change speed transmission mechanism. In connection with such transmission units as heretofore constructed it has been found difficult, however, to satisfactorily take care of certain structural features and operating characteristics which may be desirable or required, for instance, where the assembly is intended for heavy duty use, as in tractors, and where a relatively large number of available gear ratios must be provided for in the change speed transmission.

Generally, it is an object of the invention to provide an improved propelling and power take-off drive mechanism for motor vehicles, which will be operable selectively to either propel the vehicle or to drive external machinery, or to propel the vehicle and to drive external machinery at the same time.

More specifically, it is an object of the invention to provide an improved transmission unit which may readily be connected in driven relation to the vehicle motor, as for instance by means of a conventional master clutch and propeller shaft; which includes an output element which may readily be connected in driving relation to the ground engaging propelling elements of the vehicle, as for instance by means of a conventional differential mechanism and final drive gearing; and which further includes a drive element for a power take-off mechanism through which the latter may be supplied with power from the vehicle motor and be driven at a speed proportional to the speed of the vehicle motor, either in conjunction with or independently of the mentioned output element. In this connection, it is a further object of the invention to incorporate in the transmission unit a change speed mechanism having a rotatable input element which will also serve as the mentioned drive element for the power take-off mechanism and which will be continuously driven by the vehicle motor when the latter is running and the master clutch is engaged, the arrangement being such that the mentioned output element may be connected in driven relation with or disconnected from the input element, and that power may be transmitted from the input element through the change speed mechanism, at any one of a number of available gear ratios, in order to propel the vehicle, and so that the power take-off mechanism may be connected in driven relation with or disconnected from the input element and power may be transmitted from the input element directly to the power take-off mechanism, that is, without passing through any gear or gears of the change speed mechanism.

A further object of the invention is to provide a transmission unit incorporating a continuously rotatable input element, a change speed mechanism and a power take-off mechanism, as set forth hereinbefore, and in which said change speed mechanism is so constructed and arranged as to afford a selection of certain operating ranges and a selection of various speeds in each operating range.

A further object of the invention is to provide a transmission unit incorporating a continuously rotatable input element, change speed gearing and power take-off mechanism, as set forth hereinbefore, and in which a pair of axially spaced bearings for supporting the input element are normally flooded by lubricant, so that no splash or feed system will be required for elevating lubricant to said bearings when the transmission unit is operative to drive external machinery while the vehicle is standing still.

A further object of the invention is to provide a transmission unit incorporating lubricant flooded bearings as set forth hereinbefore, and in which the flooding of the bearings may be accomplished by filling a housing containing the change speed gearing with lubricant to a certain level, the transmission unit being so constructed that some of the change speed gears will be at least partially immersed in said lubricant and so that the entire change speed gearing will be properly lubricated when the latter is operative to transmit power, at any selected gear ratio, from the mentioned input element to the output element which is connected to the drive gearing for the propelling elements of the vehicle.

A still further object of the invention is to provide a transmission unit having a housing filled with lubricant to a certain level as set forth hereinbefore, and in which agitation of the lubricant, which may result in splashing or churning of the latter, and the consequent power loss will be minimized when the unit is operative to drive external machinery while the vehicle is standing still.

A further object of the invention is to provide a power transmitting unit of the character set forth hereinbefore, which will stand up and perform reliably and efficiently under severe operating conditions such as are encountered in tractor service; which is relatively simple and compact in construction, and which may be manufactured at reasonably low cost.

The foregoing and other objects and advantages of the invention will become more fully apparent from the following description of a preferred embodiment of the invention shown in Figs. 1 and 2 of the accompanying drawing, and of a modified construction shown in Fig. 3.

Figure 1:
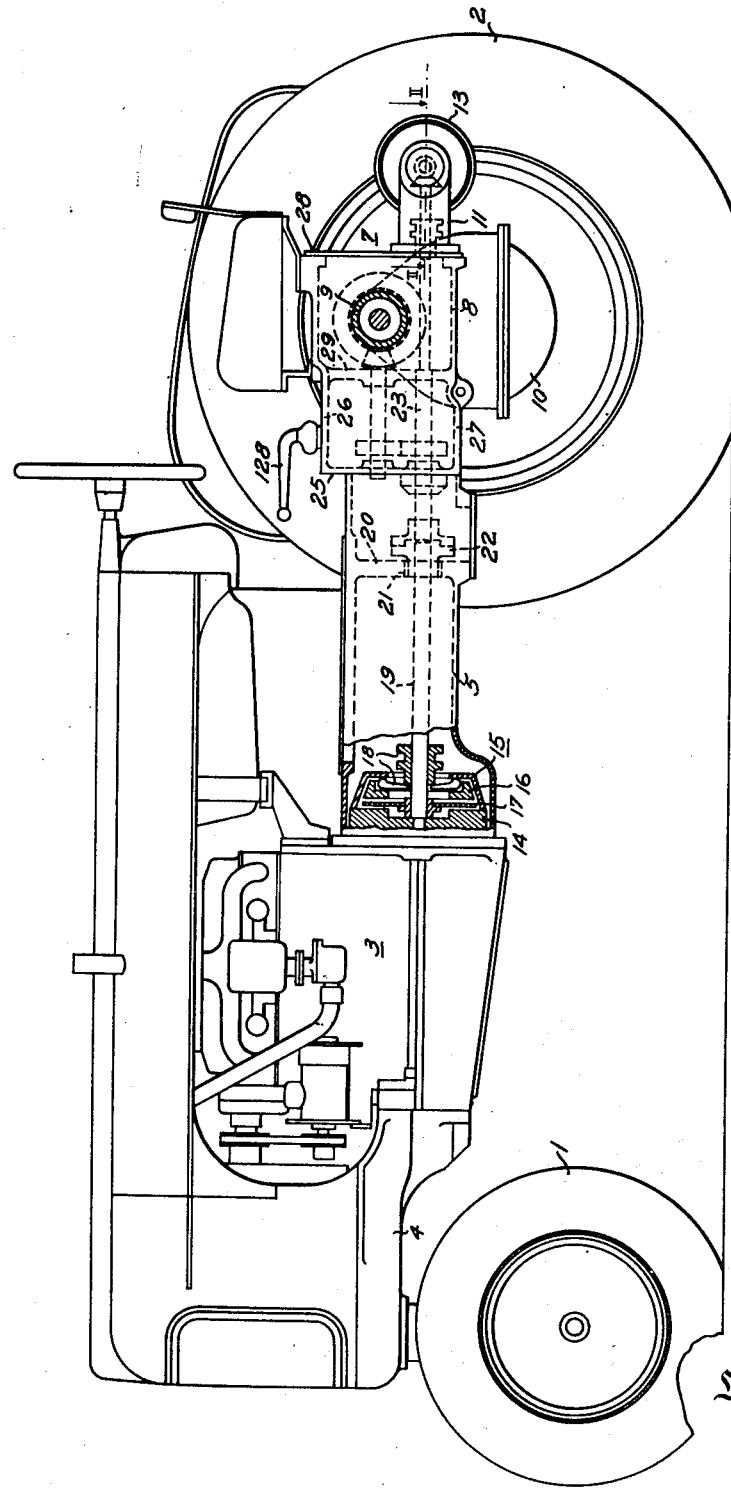
Fig. 1 is a side view of a wheel type tractor, the near rear wheel and part of the rear axle structure at the left side of the tractor being omitted for purposes of exposure.

Referring to Fig. 1, which shows a wheeled tractor of the frameless type, the body of the tractor is supported on a pair of steerable front wheels 1 and on a pair of widely spaced propelling wheels 2, the near or left propelling wheel being omitted for purposes of exposure as mentioned hereinbefore. The tractor body comprises a motor unit 3, a front bracket 4, secured to the motor unit 3, a torque tube housing 5 which extends rearwardly from and is secured to the motor unit 3, and a rear unit designated generally by the reference character 7.

The rear unit 7 comprises a central housing structure 8, a pair of hollow side arms which extend horizontally in opposite directions from the housing 8, and a pair of depending final drive housings at the outer ends of the side arms, the hollow side arm at the left side of the tractor being indicated by the reference character 9 and the depending final drive housing at the right side of the tractor being indicated by the reference character 10. The housing 8, side arms and final drive housings form an upwardly arched rear axle structure and the propelling wheels 2 are rotatably mounted on the final drive housings 10, in conformity with established practice. Detachably secured to the rear end of the housing 8 is an L-shaped housing 11 for a power take-off mechanism which will be described more fully hereinbelow, and which includes a belt pulley 13.

The housing structure 8 has forward and rearward compartments in which a change speed transmission mechanism and a differential mechanism are respectively mounted for transmitting power from the motor unit 3 to the propelling wheels 2 through conventional final drive gearings, not shown, which are enclosed in the final drive housings 10. The motor unit 3 comprises an internal combustion engine including a flywheel 14, the flywheel 14 forming part of a master clutch assembly 15. The master clutch assembly 15 is enclosed in a flared forward portion of the housing 5 and includes, in addition to the flywheel 14, the usual pressure plate 16, friction disk 17 and an actuating mechanism 18 which is operable by a foot pedal not shown. A propeller shaft 19 is piloted at its forward end in the flywheel 14 and extends rearwardly of the clutch assembly 15 through a transverse wall 20 of the housing 5, in which it is journaled by means of an anti-friction bearing 21. Secured to the shaft 19 at its rear end is the forward half of a coupling 22.

An input shaft 23 of the change speed transmission is rotatably mounted within the housing 8 in coaxial relation to the shaft 19. The input shaft 23 extends forwardly from housing 8, and secured to the forwardly extending portion of the shaft 23 is the other half of the coupling 22, the two halves of the coupling being detachably and rigidly connected together to establish a driving connection between the shafts 19 and 23.

Figures 2, 3:
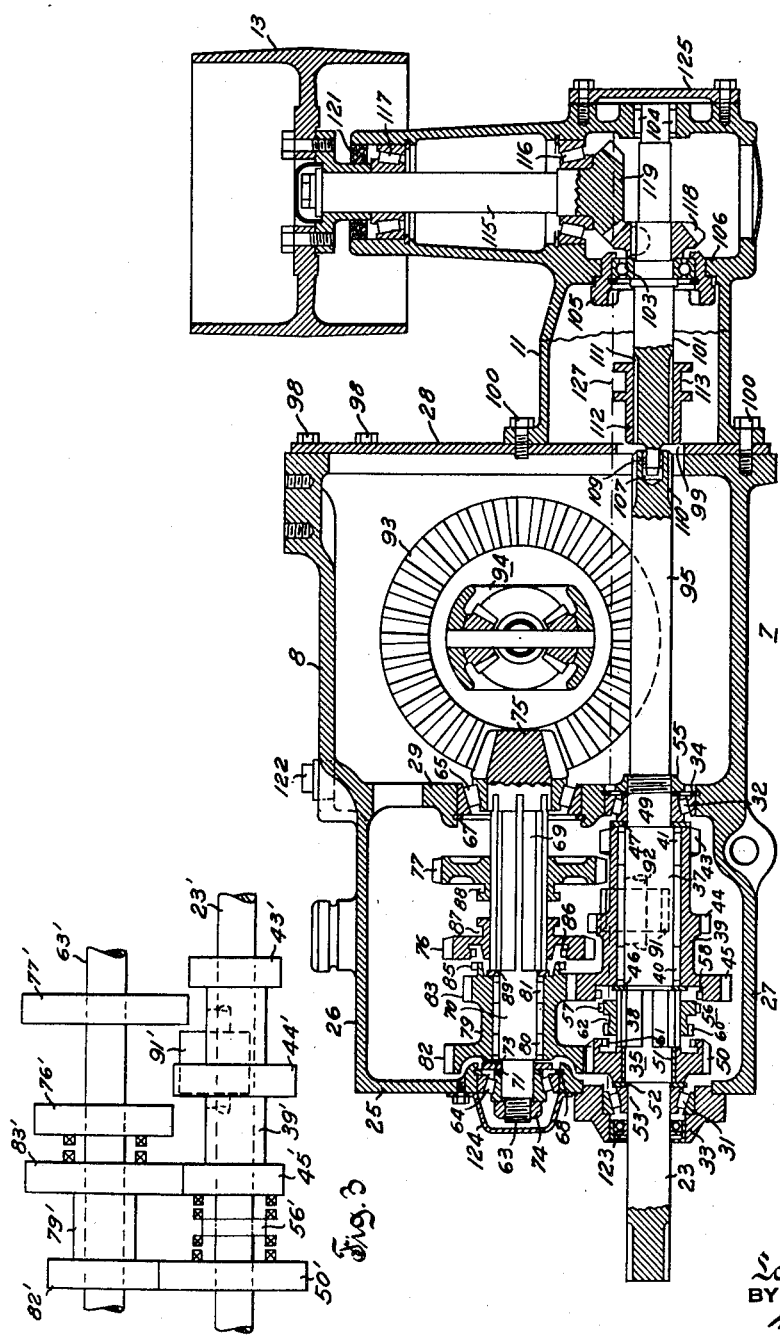
Fig. 2 is an enlarged sectional view of a propelling and power take-off drive mechanism which is incorporated in the tractor shown in Fig. 1, the view in Fig. 2 showing a change speed transmission mechanism in section on a central vertical plane extending longitudinally of the tractor, and a power take-off mechanism in section on line II—II of Fig. 1.
Fig. 3 is a schematic showing of a modified gear arrangement for the transmission mechanism shown in Fig. 2.

Referring to Fig. 2, the housing 8 has a front wall 25, a top wall 26, a bottom wall 27, right and left side walls, and a rear aperture closed by an end plate 28. The interior of the housing 8 is divided by an inner transverse wall 29 into forward and rearward compartments in which the change speed transmission mechanism and the differential mechanism are respectively mounted.

The input shaft 23 of the change speed transmission extends through the forward compartment and into the rearward compartment of the housing 8, and it is rotatably supported in the housing by means of tapered anti-friction roller bearings 31 and 32 which are mounted, respectively, on the front wall 25 and in the transverse wall 29. The bearing 31 is seated in a bearing cap 33 which is fitted into an aperture of the front wall 25 and held in place by axial cap screws, not shown, and the bearing 32 is fitted into an aperture in the wall 29. A snap ring 34 forming an abutment for the outer race of the bearing 32 is seated in an annular groove of the aperture in the wall 29.

The shaft 23 has a radially enlarged cylindrical portion 35 rearwardly of the bearing 31, and another radially enlarged portion 37 forwardly of the bearing 32. Intermediate the shaft portions 35 and 37 the shaft 23 has an externally splined portion 38, the crown diameter of the splined portion 38 being larger than the diameters of the shaft portions 35 and 37.

A one-piece or integrally formed gear cluster 39 is rotatably mounted on the shaft portion 37 by means of roller bearings 40 and 41, which are interposed between the hub of said gear cluster and the cylindrical surface of the shaft portion 37. The gear cluster 39 comprises a rearward gear section 43, an intermediate gear section 44, and a forward cupped gear section 45, the three gear sections of the gear cluster 39 being arranged in increasing order of pitch diameter from rear to front, the gear section 43 of relatively smallest pitch diameter being rearmost and the gear section 45 of relatively largest pitch diameter being foremost. Locating washers 46 and 47 are mounted on the shaft 23 at the axially opposite ends of the gear cluster 39, the washer 46 being seated against the rearward end faces of the splines on the shaft portion 38, and the washer 47 being seated against a shoulder of the junction between the shaft portion 37 and a rearward journal portion 49 of the shaft.

Rearwardly of the bearing 31 and on the shaft portion 35 a gear 50 is rotatably mounted by means of a cylindrical bushing 51 which is interposed between the hub of the gear 50 and the cylindrical surface of the shaft portion 35. A locating washer 52 is mounted on the shaft 23 forwardly of the gear 50 in abutting relation to a shoulder at the junction between the shaft portion 35 and a forward journal portion 53 of the shaft 23. Rearwardly of the bearing 32 a nut 55 is threaded upon the shaft 23, and the nut 55 is drawn up against the inner race of the bearing 32 in order to securely position the washer 47 on the shaft. The shaft 23 is retained in axially fixed position on the housing 8 by means of the roller bearings 31 and 32, and the axial play of the roller bearings 31 and 32 may be adjusted by means of shims, not shown, between the cap 33 and the front wall 25 of the housing 8. It will be seen that the gear 50 is supportingly mounted on the input shaft 23 for rotation relative thereto and that it is retained in a predetermined axial position between the locating washer 52 and the forward end faces of the splines on the shaft portion 38. The gear cluster 39 is likewise supportingly mounted on the input shaft 23 for rotation relative thereto, and it is retained in an axially predetermined position between the locating washers 46 and 47.

A clutch collar 56 is non-rotatably and shiftably mounted on the splined portion 38 of the shaft 23 intermediate the gear 50 and the gear cluster 39, the clutch collar 56 having internal splines matching the splines of the shaft portion 38. The collar 56 has formed on it a rearward annular series of external clutch teeth 57 adapted for engagement with a corresponding series of internal clutch teeth 58 formed in the cupped gear section 45 of the gear cluster 39. Similarly, a forward annular series of external clutch teeth 60 are formed on the collar 56, for engagement with a corresponding series of internal clutch teeth 61 formed in a cupped portion of the gear 50. A groove 62 is formed on the collar 56 between the teeth 57 and 60 for engagement with a shifter fork, not shown.

A shaft 63 which forms the output shaft for the change speed transmission is mounted in the housing 8 above the input shaft 23, the axis of the output shaft 63 extending parallel to the axis of the input shaft 23 and in a vertical plane through the axis of the latter shaft. A pair of tapered roller bearings 64 and 65 for the output shaft 63 are mounted, respectively, in the front wall 25 and in the inner wall 29 of the housing 8. A snap ring 67 which forms a forward axial abutment for the outer race of the bearing 65, is seated in an annular groove of the aperture for the bearing 65 in the wall 29, and another snap ring 68 which forms a rearward axial abutment for the outer race of the bearing 64 is seated in an annular groove of the aperture for the bearing 64 in the front wall 25.

In the space between the bearings 64 and 65, the shaft 63 has a splined portion 69 and a cylindrical portion 70, the root diameter of the splined portion being equal to or slightly larger than the diameter of the cylindrical portion 70. A spacer 71 and a locating washer 73 are mounted on the shaft 63 between the forward roller bearing 64, and a shoulder at the forward end of the cylindrical shaft portion 70. An adjusting nut 74 is threaded upon the shaft 63 forwardly of said inner race, and the inner race of the rearward roller bearing 65 is seated against a bevel pinion 75 on the shaft 63. The nut 74 is adjusted and suitably secured in adjusted position, to provide for free rotation of the shaft 63 within the bearings 64 and 65 without appreciable axial play.

Speed selecting gears 76 and 77 are supportingly mounted on the splined portion 69 of the shaft 63 in non-rotatable and axially slidable relation thereto, these gears having internal hub splines matching the splines of the shaft portion 69. The gear 76 and the gear section 44 of the gear cluster 39 are so proportioned that the gear 76 may be shifted rearwardly from the neutral position in which it is shown in Fig. 2, into mesh with the gear section 44. Similarly, the gear 77 and the gear section 43 of the gear cluster 39 are so proportioned that the gear 77 may be shifted rearwardly from the neutral position in which it is shown in Fig. 2 into mesh with the gear section 43.

Forwardly of the shiftable gears 76 and 77, a one-piece or integrally formed gear cluster 79 is rotatably mounted on the cylindrical shaft portion 70 by means of roller bearings 80 and 81 which are interposed between the hub of the gear cluster 79 and the cylindrical surface of the shaft portion 70. The gear cluster 79 comprises a gear section 82 in constant mesh with the gear 50, and a gear section 83 in constant mesh with the gear section 45 of the gear cluster 39. The gear cluster 79 has formed thereon, at its rear end, an annular series of external clutch teeth 85 for engagement with a corresponding annular series of internal clutch teeth 86 formed in a cupped portion of the gear 76. The hubs of the gears 76 and 77 have, respectively, formed thereon grooves 87 and 88 for engagement with shifter forks, not shown. A locating washer 89 is mounted on the shaft 63 in abutting relation to the forward ends of the splines of the shaft portion 69. It will be noted that the gear cluster 79 is supportingly mounted on the output shaft 63 for rotation relative thereto, and that the gear cluster 79 is retained in a predetermined axial position relative to the shaft 63 between the locating washers 73 and 89.

A reverse idler 91, indicated in Fig. 2 by dotted lines, is rotatably mounted on a countershaft 92 also indicated in dotted lines, and the countershaft 92, in turn, is mounted in the forward compartment of the housing 8 in such position that the reverse idler 91 will be in constant mesh with the gear section 44 of the gear cluster 39. The mounting of the countershaft 92 in the housing 8 is not indicated in detail but it will be understood that the housing 8 is suitably constructed to provide for such mounting of the countershaft 92. The teeth of the reverse idler 91 are about twice as long axially as the teeth of the gear section 44 of the gear cluster 39, and the circumferential and axial relation of the reverse idler 91 to the gear section 44 is such that the gear 77 may be brought into mesh with the reverse idler 91 upon forward shifting of the gear 77 from the neutral position in which it is shown in Fig. 2.

The bevel pinion 75 is integrally formed with the output shaft 63 and cooperates, within the rearward compartment of the housing with a ring gear 93 of a conventional differential mechanism 94. The differential mechanism 94 is mounted in the rearward compartment of the housing 8 for rotation about an axis at right angles to the axis of the output shaft 63, and the half shafts of the differential are drivingly connected in the usual manner with the final drive gearings for the propelling wheels 2.

Referring again to the input shaft 23 of the change speed transmission, a portion 95 of said shaft within the rearward compartment of the housing 8 forms an integral axial extension of the portion of the shaft which is journaled in the roller bearings 31 and 32. The shaft extension 95 is preferably long enough, as shown, so as to span substantially the entire space between the inner wall 29 and the end plate 28 which is attached to the rear end of the housing 8. The end plate 28 is secured to the housing 8 by bolts 98 and has an aperture 99 coaxial with the shaft extension 95.

The power take-off housing 11 is detachably secured to the end plate 28 of the housing 8 by bolts 100, and a driving shaft 101 of the power take-off mechanism is rotatably mounted in the housing 11 in axial alignment with the input shaft 23 of the change speed transmission. The shaft 101 is journaled in a ball bearing 103 and in a roller bearing 104 which are mounted in axial alignment with each other in the power take-off housing 11, as shown in Fig. 2. The bearing 103 is mounted in axially fixed position in a bearing cap 105 within the power take-off housing 11, the latter having an internal flange 106 to which the cap 105 is secured, preferably in such a manner as to permit adjustment of the cap 105 relative to the housing 11 in the axial direction of the shaft 101. A radially reduced forward end portion of the shaft 101 is piloted in a short axial bore 107 of the shaft extension 95 by means of a bushing 109, the pilot connection between the shaft 101 and the shaft extension 95 permitting removal of the entire power take-off mechanism, as an assembled unit, from the housing 8 while the shaft 23 remains in place.

Formed at the rear end of the shaft extension 95 are axially extending external splines 110 adapted to be engaged by internal splines 111 of a clutch sleeve 112 which is non-rotatably and slidably mounted on a splined forward portion of the shaft 101. The clutch sleeve 112 is provided with a groove 113 for engagement with a shifter fork of a shift mechanism not shown, and by means of which the clutch sleeve 112 may be shifted forwardly from the position in which it is shown in Fig. 2, into clutching engagement with the splines 110 of the shaft extension 95, the aperture 99 of the plate 28 accommodating such forward movement of the clutch sleeve 112.

In addition to the driving shaft 101, a driven shaft 115 of the power take-off mechanism is rotatably mounted in the housing 11, the driven shaft 115 being disposed at right angles to the driving shaft 101 and extending in a horizontal plane through the axis of the shaft 101, as indicated in Fig. 1. For purposes of showing the shaft 115 and its mounting more clearly, the rear part of the power take-off mechanism is shown in Fig. 2 in a position displaced angularly 90 degrees from its actual position on the tractor.

The shaft 115 is rotatably supported in axially aligned conical roller bearings 116 and 117 which are mounted in a hollow transverse portion of the housing 11, as shown in Fig. 2, and the shaft 115 is connected in driven relation with the shaft 101 through a pair of permanently meshing bevel gears 118 and 119. The bevel gear 118 is keyed to the shaft 101, and the bevel gear 119 is integrally formed with the shaft 115. The shaft 115 projects axially from the hollow transverse portion of the housing 11 and carries at its outer end the belt pulley 13 which is secured to the shaft 115 for rotation in unison therewith. An oil seal 121 is operatively interposed between the shaft 115 and the hollow transverse portion of the housing 11.

The top wall of the housing 8 has a lubricant inlet opening which is normally closed by a plug 122, and the interior of the housing 8 and the interior of the power take-off housing 11 provide a space for the storage of a relatively large quantity of lubricant. The mentioned inlet opening communicates with the rearward compartment of the housing 8, and upon admission of lubricant through the inlet opening, the lubricant will flow from the rearward to the forward compartment of the housing 8 through a suitable passage, not shown, in the lower part of the wall 29, and into the power take-off housing 11 through the aperture 99 in the end plate 28. In addition to the oil seal 121 in the transverse arm of the power take-off housing 11 an oil seal 123 is provided in the cap 33 for the roller bearing 31 to prevent loss of lubricant from the mentioned storage space. The aperture for the roller bearing 64 in the front wall 25 of the housing 8 is closed by a cap 124, and the aperture for the roller bearing 104 at the rear end of the power take-off housing 11 is closed by a cap 125.

The dash-dotted line 127 in Fig. 2 indicates the level to which the interiors of the housings 8 and 11 are normally filled with lubricant of suitable consistency for lubricating the gears and bearings of the transmission, differential, and power take-off mechanisms. For this purpose, ordinary transmission lubricant such as commonly used in tractor transmissions, may be employed, for instance lubricant having an SAE rating of 30W or 90W.

It will be noted that when the housings 8 and 11 are filled with lubricant to the level indicated by the dash-dotted line 127, the bearings 31 and 32 for the shaft 23, the bearings 103, 104 for the shaft 101, the bearings 116, 117, for the shaft, 115 and the pilot bearing for the shaft 101 in the shaft 95 are flooded by lubricant, the shafts 23, 101 and 115 being submerged in the lubricant.

The mechanism shown in Fig. 2 forms a propelling and power take-off drive mechanism for the tractor shown in Fig 1, as has been pointed out hereinbefore. During standstill of the tractor, that is, when the change speed transmission is in neutral as shown in Fig. 2, the input shaft 23 may be rotated by the tractor motor independently of the gear 50 and of the gear cluster 39, or in other words, the gear 50 and the gear cluster 39 may remain at rest while the input shaft 23 of the change speed transmission is driven by the tractor motor and the tractor is standing still. The driving shaft 115 of the power take-off mechanism may be coupled to the shaft 23 through the clutch sleeve 112 for rotation in unison therewith, and power may therefore be transmitted to the belt pulley 13 while the tractor is standing still.

It will be noted that when the tractor is standing still and the shafts 23, 101 and 115 are rotating for power take-off purposes the lubricant in which the gear 50 and the gear cluster 39 are immersed will not be subject to splashing or churning as it would be if the gear 50 or the gear cluster 39 were positively driven during operation of the power take-off mechanism while the tractor is standing still.

The clutch collar 56 rotates in unison with the shaft 23 when the latter is rotating, but because of the relatively short axial length and small diametrical dimensions of the collar 56 the amount of lubricant splashed and churned by said collar is relatively small in proportion to the total amount of lubricant contained within the housings 8 and 11.

Observations have shown that substantial splashing and churning of the lubricant in the transmission housing, if allowed to occur during operation of the mechanism for power take-off purposes while the tractor is standing still, cause an appreciable power loss especially in winter when the lubricant is cold and relatively stiff. On the other hand, when the lubricant is warm, as in summer, additional generation of heat due to churning, has been found undesirable and objectionable because of the danger of overheating and its incident harmful results. Excessive splashing and churning of the lubricant may also be considered undesirable from the standpoint of oxidation of the lubricant, especially at high temperatures.

The disadvantages and shortcomings which have just been discussed are successfully overcome by the construction of the mechanism shown in Fig. 2 which, as stated, may be operated to drive the power take-off mechanism while the tractor is standing still without subjecting the lubricant in the housing 8 to substantial splashing and churning.

A further advantage of the mechanism shown in Fig. 2 resides in the fact that breathing of the lubricant in the housing 8 due to successive heating and cooling thereof will be reduced because no or substantially no heat will be generated by churning of the lubricant when the mechanism is used for power take-off purposes while the tractor is standing still.

It should further be noted that the gear arrangement in the transmission as shown in Fig. 2, is such that the operator may dispense with the usual practice of depressing the pedal of the master clutch while starting, in order to relieve the electric starting motor from unnecessary load, when the tractor is equipped with an electric starter.

During operation of the tractor with the change speed transmission in gear, as will be more fully discussed hereinbelow, the bearings for the output shaft must be supplied with lubricant. This may be accomplished in conventional manner by means of a suitable lubricating system, not shown, which will function to elevate some of the lubricant which is stored in the transmission housing, above the level indicated by the dash-dotted line 127 and to feed such lubricant to the roller bearings 64 and 65 when the output shaft 63 is driven, and which system may remain inoperative when the tractor is standing still and used for driving external machinery from the belt pulley 13.

With reference to the change speed transmission, it has been pointed out hereinbefore, that when the transmission is in neutral, as shown in Fig. 2, the gear 50, which represents a first gear element, and the gear cluster 79 which represents an auxiliary gear means, are supportingly mounted on the input and output shafts, respectively, for rotation relative thereto, and that the gear cluster 39 which represents a second gear element is supportingly mounted on the input shaft for rotation relative to the latter shaft. Accordingly, when the tractor motor is running and the master clutch 15 is engaged, all of the transmission gears in the housing 8 may remain stationary.

The various gears of the change speed transmission mechanism shown in Fig. 2 are so arranged and so proportioned as to provide six forward speeds and two reverse speeds, as follows:

First or lowest speed may be established by clutching gear 50 to the input shaft 23 through the clutch collar 56, and by moving gear 77 rearwardly into meshing engagement with the gear section 43 of the gear cluster 39. The power flow is then from the input shaft 23 through the clutch collar 56, permanent mesh gears 50, 82, permanent mesh gears 83, 45, and gears 43, 77 to the output shaft 63. This speed involves three loaded gear contacts, namely, between gear 50 and gear section 82, between gear sections 83 and 45, and between gear section 43 and gear 77.

Next highest or second speed may be established by clutching gear 50 to the input shaft 23, the same as in first or lowest speed, and by moving gear 76 into meshing engagement with the gear section 44 of the gear cluster 39. The power flow is then from the input shaft 23, through the clutch collar 56, permanent mesh gears 50, 82, permanent mesh gears 83, 45, and gears 44, 76, to the output shaft 63. This speed again involves three loaded gear contacts, namely, between gear 50 and gear section 82, between gear sections 83 and 45, and between gear section 44 and gear 76.

Next highest or third speed may be established by clutching gear cluster 39 to the input shaft 23 through clutch collar 56 and by moving gear 77 into meshing engagement with the gear section 43 of the gear cluster 39. The power flow is then from the input shaft 23, through the clutch collar 56, and gears 43, 77 to the output shaft 63. This speed involves only one loaded gear contact, namely, between gear section 43 and gear 77.

Next highest or fourth speed may be established by clutching gear 50 to the input shaft 23 through the clutch collar 56 and by moving the gear 76 into clutching engagement with the gear cluster 79. The power flow is then from the input shaft 23 through the clutch collar 56, and permanent mesh gears 50, 82 to the output shaft. This speed again involves only one loaded gear contact, namely, between gear 50 and gear section 82.

Next highest or fifth speed may be established by clutching the gear cluster 39 to the input shaft 23 through the clutch collar 56 and by moving the gear 76 into meshing engagement with the gear section 44 of the gear cluster 39. The power flow is then from the input shaft 23 through the clutch collar 56, and through the gears 44, 76 to the output shaft 63. This speed, like the third and fourth speeds, involves only one loaded gear contact, namely, between gear section 44 and gear 76.

The next highest or sixth speed may be established by clutching the gear cluster 39 to the input shaft 23 through the clutch collar 56 and by moving the gear 76 into clutching engagement with the gear cluster 79. The power flow is then from the input shaft 23 through the clutch collar 56, and permanent mesh gears 45, 83 to the output shaft 63. This speed, like the third, fourth and fifth speeds, involves only one loaded gear contact, namely, between gear sections 45 and 83.

Low reverse may be established by clutching the gear 50 to the input shaft 23 through the clutch collar 56, and by shifting the gear 77 into meshing engagement with the reverse idler 91. The power flow is then from the input shaft 23 through the clutch collar 56, permanent mesh gears 50, 82, permanent mesh gears 83, 45, gears 44, 91, 77 to the output shaft 63. This speed involves four loaded gear contacts, namely, between gear 50 and gear section 82, between gear sections 83, 45, between gear section 44 and reverse idler 91, and between reverse idler 91 and gear 77.

High reverse may be established by clutching the gear cluster 39 to the input shaft 23 through the clutch collar 56 and by moving the gear 77 into meshing engagement with the reverse idler 91. The power flow is then from the input shaft 23 through the clutch collar 56, and gears 44, 91, 77 to the output shaft 63. This speed involves two loaded gear contacts, namely, between gear section 44 and reverse idler 91, and between reverse idler 91 and gear 77.

From the foregoing description of the operation of the transmission, it will be noted that the gear 50 is clutched to the shaft 23 through the clutch collar 56 for establishing first, second, fourth and low reverse speeds, and that the gear cluster 39 is clutched to the shaft 23 through the clutch collar 56 for establishing third, fifth, sixth, and high reverse speeds. In other words, the clutching engagement of the clutch collar 56 with the gear 50 establishes one operating range of the transmission, in which first, second, fourth, or low reverse speed may be selected, and clutching engagement of the clutch collar 56 with the gear cluster 39 establishes another operating range of the transmission in which third, fifth, sixth or high reverse speed may be selected.

Considering the gear cluster 79, gear 50 with its clutch teeth 61, the gear 45 with its clutch teeth 58, and the clutch collar 56 as range selecting gearing, and further considering the gears 76, 77, the gear sections 43 and 44 of the gear cluster 39, and the clutch comprising clutch teeth 85 and 86 as speed selecting gearing, it will be seen that the range selecting gearing and the speed selecting gearing are arranged in such relation to the input shaft 23 and to the output shaft 63, that these two shafts serve as the sole support for all of the range and speed selecting gearing. The reverse idler 91 is mounted independently of the input and output shafts, and provides for one reverse speed in each range, as has been explained hereinbefore.

In order to effect the shifting of the gears 76 and 77, and of the clutch collar 56 into the various positions and proper relations to each other as discussed hereinbefore, the transmission includes a suitable shift mechanism, not shown, which is preferably mounted on the housing 8 and which may be constructed in accordance with well established principles. Preferably the shift mechanism is so constructed that the various speed ratios may be selected by manipulation of a single operating lever such as indicated at 128 in Fig. 1.

Referring to Fig. 2, it will be noted that power may be supplied from the shaft 23 to the propelling wheels 2 through the transmission, differential and final drive gearings, and that at the same time power may be supplied from the shaft 23 to the power take-off pulley 13 through the sleeve 112, shaft 101, permanently meshing gears 118, 119, and shaft 115.

On the other hand, power may be transmitted solely to the propelling wheels through the transmission, differential and final drive gearings, the sleeve 112 in that case being disengaged from the shaft extension 95. Conversely, power may be transmitted solely to the power take-off pulley 13 through the sleeve 112, shaft 101, permanent mesh gears 118, 119 and shaft 115, the transmission in that case being adjusted to the neutral position in which it is shown in Fig. 2.

From the foregoing explanations it will be seen that the power take-off mechanism may be operated to supply power to external machinery regardless of whether the tractor is moving or standing still, and that the tractor may move forwardly or rearwardly, or may remain at standstill regardless of whether the power take-off mechanism is drivingly connected to the transmission input shaft through the clutch sleeve 112.

Referring again to the change speed transmission shown in Fig. 2, it has been pointed out hereinbefore that some of the forward speeds, namely, the third, fourth, fifth and sixth speeds, each involve only one loaded gear contact, and that the other forward speeds, namely, the first and the second, each involve three loaded gear contacts. The third, fourth, fifth and sixth speeds are preferably so proportioned that they will be the ones which will be used most frequently under ordinary operating conditions of the tractor, and the first and second speeds are so proportioned that they will be the ones which will be used least frequently. It has also been pointed out hereinbefore that the transmission shown in Fig. 2 affords two operating ranges, and it will be noted that some of the more frequently used speeds, namely, the third, fifth and sixth are in one operating range, while the fourth speed, which is another of the more frequently used speeds, and the first and second speeds are in the other range.

Fig. 3 of the drawings shows a possible modification of the change speed transmission mechanism shown in Fig. 2, which modification may be adopted in order to provide for successive selection of progressively increasing speeds first in one range and then in the other.

The modified construction illustrated in Fig. 3 conforms with the construction shown in Fig. 2, insofar as the number of gears, the mounting of the gears, and the provision of jaw clutches is concerned, and the primed reference characters appearing in Fig. 3 designate parts which correspond to the parts indicated by the same but unprimed reference characters appearing in Fig. 2. The principal difference between the construction shown in Fig. 2 and the modified construction shown in Fig. 3 resides in the relative diametrical proportioning of the several gears.

Comparing the pair of permanent mesh gears 50' and 82' in Fig. 3 with the corresponding pair of permanent mesh gears 50 and 82 in Fig. 2, it will be noted that in the modified construction the pitch diameter of the gear 50' is larger than the pitch diameter of the gear 82', whereas in Fig. 2 the pitch diameter of the gear 50 is smaller than the pitch diameter of the gear 82. Similarly, the relative diametrical proportioning of the permanent mesh gears 45' and 83' in Fig. 3 is reversed as compared with the permanent mesh gears 45 and 83 in Fig. 2, that is, the pitch diameter of the gear section 45' is smaller than the pitch diameter of the gear section 83' whereas the pitch diameter of the gear section 45 in Fig. 2 is larger than the pitch diameter of the gear section 83.

Further comparing the gear sections 44' and 45' in Fig. 3 with the corresponding gear sections 44 and 45 in Fig. 2, it will be noted that the pitch diameter of the gear section 44' is larger than the pitch diameter of the gear section 45', whereas in Fig. 2, the pitch diameter of the gear section 44 is smaller than the pitch diameter of the gear section 45.

The modified transmission mechanism shown in Fig. 3 affords six forward speeds and two reverse speeds as follows:

First or lowest speed may be established by clutching gear cluster 39' to the input shaft 23' through clutch collar 56', and by moving gear 77, rearwardly into meshing engagement with gear section 43' of the gear cluster 39'. The power flow is then from input shaft 23' through clutch collar 56' to gear cluster 39', and through gear section 43' and gear 77' to the output shaft 63'. This speed involves one loaded gear contact, namely, between gear section 43' and gear 77'.

Next highest or second speed may be obtained by clutching gear cluster 39' to the input shaft 23' through clutch collar 56' and by moving gear 76' into clutching engagement with gear cluster 79'. The power flow is then from the input shaft 23' through the clutch collar 56' to the gear cluster 39', and through the permanently meshing gears 45' and 83' and clutch teeth 85, 86 to the output shaft 63'. This speed involves one loaded gear contact, namely, between the gear sections 45' and 83'.

Next highest or third speed may be obtained by clutching gear cluster 39' to the input shaft 23' through clutch collar 56' and by moving gear 76' prior into meshing engegement with gear section 44' of the gear cluster 39'. The power flow is then from the input shaft 23' to the clutch collar 56' through the gear cluster 39' and through gear section 44' and gear 76' to the output shaft. This speed involves only one loaded gear contact, namely, between the gear section 44' and the gear 76'.

Next highest or fourth speed may be obtained by clutching gear 50' to the input shaft 23' through clutch collar 56' and by moving gear 77' rearwardly into meshing engagement with gear section 43' or the gear cluster 39'. The power flow is then from the input shaft 23' through the clutch collar 56', to the gear 50', and from the gear 50' through gear sections 82', 83' and 45' through the gear cluster 39', and from the gear cluster to gear section 43' and gear 77' to the output shaft. This speed involves three loaded gear contacts, namely, between the gear 50' and gear section 82', between the gear sections 83' and 45', and between the gear section 43' and gear 77'.

Next highest or fifth speed may be obtained by clutching gear 50' to the input shaft 23' through clutch collar 56' and by moving gear 76' forwardly into clutching engagement with the gear cluster 79'. The power flow is then from the input shaft 23' through the clutch collar 56' to the gear 50' and from the gear 50' through gear section 82' and clutch teeth 85' and 86' to the output shaft 63'. This speed involves only one loaded gear contact, namely, between the gear 50' and the gear section 82'.

Next highest or sixth speed may be obtained by clutching gear 50' to the input shaft 23' through clutch collar 56' and by moving gear 76' rearwardly into meshing engagement with gear section 44' of the gear cluster 39'. The power flow is then from the input shaft 23' through the clutch collar 76' through gear 50'; from gear 50' through gear sections 82', 83' and 45' to the gear cluster 39'; and from the gear cluster 39' to gear section 44' and gear 76' to the output shaft 63'. This speed involves three loaded gear contacts, namely, between the gear 50' and the gear section 82', between the gear sections 83' and 45', and between the gear section 44' and the gear 76'.

Low reverse may be obtained by clutching gear cluster 39' to the input shaft 23' through clutch collar 56' and by moving gear 77' forwardly into meshing engagement with the reverse idler 91'. The power flow is then from the input shaft 23' through clutch collar 56' to the gear cluster 39' and from the gear cluster 39' through gear section 44', reverse idler 91' and gear 77' to the output shaft. This speed involves two loaded gear contacts, namely, between the gear section 44' and the reverse idler 91' and between reverse idler 91' and the gear 77'.

High reverse may be established by clutching gear 50' to the input shaft 23' through clutch collar 56' and by moving gear 77' forwardly into meshing engagement with the reverse idler 91'. The power flow is then from the input shaft 23' through the clutch collar 56' to the gear 50' and from the gear 50' through gear sections 82', 83', 45' and 44' to the reverse idler 91' and from the reverse idler 91' through the gear 77' to the output shaft. This speed involves four loaded gear contacts, namely, between gear 50' and gear section 82', between gear section 83' and 45', between gear section 44' and reverse idler 91' and between reverse idler 91' and gear 77'.

From the foregoing description of the mode of operation of the modified change speed transmission mechanism shown in Fig. 3, it will be apparent that movement of the clutch collar 56' into clutching engagement with the gear cluster 39' establishes a first or low operating range of the transmission in which first, second and third forward speeds and low reverse speed may be selected. It will also be noted that movement of the clutch collar 56' into clutching engagement with the gear 50' establishes a second or high operating range of the transmission in which fourth, fifth and sixth forward speeds and high reverse speed may be selected.

As mentioned hereinbefore in connection with Fig. 2, the transmission shown in that Fig. 2 includes a suitable shift mechanism, not shown, for shifting the gears 76 and 77 and the clutch collar 56 into the various positions and proper relations to each other in order to establish the various speed ratios. Such shift mechanism may likewise be employed in order to shift the gears 76' and 77' and the clutch collar 56' of the modified mechanism shown in Fig. 3 into the various positions and proper relations to each other in order to establish the various speeds which are afforded by the modified mechanism as has been discussed hereinbefore.

It will further be noted that the gear 50' and the gear cluster 39' of the modified transmission mechanism are supportingly mounted on the input shaft 23' for rotation relative thereto and that all gears of the modified transmission mechanism shown in Fig. 3 may remain stationary when the transmission is in neutral and the input shaft 23 is driven by tractor motor. The modified transmission mechanism shown in Fig. 3, therefore, will afford the same advantages as the transmission mechanism shown in Fig. 2 insofar as the operation of the power take-off mechanism during standstill of the tractor is concerned. That is, the modified construction of the change speed mechanism as indicated in Fig. 3, like the construction shown in Fig. 2, will avoid substantial splashing and churning of the lubricant in the transmission housing when the transmission is in neutral as shown in Fig. 3 and the input shaft 23' is rotated by the tractor motor for power take-off purposes while the tractor is standing still.

It should be understood that it is not intended to limit the invention to the exact details of construction herein described with reference to the drawings, for various modifications within the scope of the appended claims may occur to persons skilled in the art.

It is claimed and desired to secure by Letters Patent:

1. In a self-propelled vehicle including a power unit, an improved transmission and power take-off drive mechanism comprising a power take-off means, an input shaft connected at one end thereof in driven relation with said power unit and at the other end thereof in driving relation with said power take-off means, an output shaft rotatably mounted in spaced parallel relation to said input shaft, a first gear element supportedly mounted on said input shaft for rotation relative thereto, an auxiliary gear means connected in permanently geared relation with said first gear element and mounted on said output shaft for rotation relative thereto, a second gear element supportedly mounted on said input shaft for rotation relative thereto independently of said first gear element and connected in permanently geared relation with said auxiliary gear means, and selectively positionable means operative to connect said input shaft in power transmitting relation with said output shaft either through said first gear element, auxiliary gear means and second gear element, or through said second gear element independently of said first gear element and said auxiliary gear means.

2. In a self-propelled vehicle including a power unit, an improved transmission and power take-off drive mechanism comprising a power take-off means, an input shaft connected at one end thereof in driven relation with said power unit and at the other end thereof in driving relation with said power take-off means, an output shaft rotatably mounted in spaced parallel relation to said input shaft, a first gear element supportedly mounted on said input shaft for rotation relative thereto, an auxiliary gear means connected in permanently geared relation with said first gear element and mounted on said output shaft for rotation relative thereto, a second gear element supportedly mounted on said input shaft for rotation relative thereto independently of said first gear element and connected in permanently geared relation with said auxiliary gear means, and selectively positionable means operative to connect said input shaft in power transmitting relation with said output shaft either through said auxiliary gear means and both of the gear elements permanently geared thereto, or through said auxiliary gear means and only one of the gear elements permanently geared thereto.

3. In a self-propelled vehicle including a power unit, an improved transmission and power take-off drive mechanism comprising a power take-off means, an input shaft connected at one end thereof in driven relation with said power unit and at the other end thereof in driving relation with said power take-off means, an output shaft rotatably mounted in spaced parallel relation to said input shaft, a first gear element supportedly mounted on said input shaft for rotation relative thereto, an auxiliary gear means connected in permanently geared relation with said first gear element and mounted on said output shaft for rotation relative thereto, a second gear element supportedly mounted on said input shaft for rotation relative thereto independently of said first gear element and connected in permanently geared relation with said auxiliary gear means, and selectively positionable means operative to connect said input shaft and said second gear element in power transmitting relation to each other either through said first gear element and auxiliary gear means or independently thereof, and additional means operable to connect the output shaft alternatively in power transmitting relation with said second gear element independently of said auxiliary gear means, or with said auxiliary gear means independently of said second gear element.

4. In a self-propelled vehicle including a power unit, a power take-off means, a lubricant confining housing mounting pairs of aligned bearings rotatably supporting a transmission input shaft and a transmission output shaft disposed in said housing in spaced parallel relation with respect to each other, means for selectively connecting opposite end portions of said input shaft in power receiving and transmitting relation to said power unit and power take-off means, respectively, a first gear element supportedly mounted on said input shaft for rotation relative thereto, an auxiliary gear means supportedly mounted on said output shaft for rotation relative thereto and permanently geared to said first gear element, a second gear element supportedly mounted on said input shaft for rotation relative thereto independently of said first gear element and in constant mesh with said auxiliary gear means, and additional means for selectively connecting said input shaft in driving relation with said output shaft either through said first gear element, auxiliary gear means and second gear element, or through said second gear element independently of said first gear element and auxiliary gear means.

5. In a self-propelled vehicle including a power unit, a power take-off means, a lubricant confining housing mounting pairs of aligned bearings rotatably supporting a transmission input shaft and a transmission output shaft disposed in said housing in spaced parallel relation with respect to each other, a first means for selectively connecting opposite end portions of said input shaft in power receiving and transmitting relation to said power unit and power take-off means, respectively, a first gear element supportedly mounted on said input shaft for rotation relative thereto, an auxiliary gear means supportedly mounted on said output shaft for rotation relative thereto and permanently geared to said first gear element, a second gear element supportedly mounted on said input shaft for rotation relative thereto independently of said first gear element and in constant mesh with said auxiliary gear means, a second means selectively positionable to connect said input shaft and said second gear element in power transmitting relation to each other either through said first gear element and auxiliary gear means or independently thereof, and additional means operable to connect said output shaft alternatively in power transmitting relation with said second gear element independently of said auxiliary gear means, or with said auxiliary gear means independently of said second gear element.

6. In a self-propelled vehicle including a power unit, a power take-off means, a lubricant confining housing mounting pairs of aligned bearings rotatably supporting a transmission input shaft and a transmission output shaft disposed in said housing in spaced parallel relation with respect to each other, said input shaft being connected at one end thereof in driven relation with said power unit and at the other end thereof in driving relation with said power take-off means, a first gear element supportedly mounted on said input shaft for rotation relative thereto, a first gear cluster supportedly mounted on said output shaft for rotation relative thereto and having a gear section in constant mesh with said first gear element, a second gear cluster supportedly mounted on said input shaft for rotation relative thereto independently of said first gear element and having a gear section in constant mesh with another gear section of said first gear cluster, an axially shiftable clutch element nonrotatably connected with said input shaft intermediate said first gear element and said second gear cluster and movable from a neutral position in one direction into clutching engagement with said first gear element, and in the opposite direction into clutching engagement with said second gear cluster, and an axially shiftable gear nonrotatably mounted on said output shaft and movable from a neutral position in one direction into clutching engagement with said first gear cluster, and in the opposite direction into meshing engagement with another gear section of said second gear cluster.

7. In a self-propelled vehicle including a power unit, a power take-off means, a lubricant confining housing mounting bearings rotatably supporting a transmission input shaft and a transmission output shaft disposed in said housing in spaced parallel relation with respect to each other, said input shaft being connected at one end thereof in driven relation with said power unit and at the other end thereof in driving relation with said power take-off means, a first gear element supportedly mounted on said input shaft for rotation relative thereto, a first gear means supportedly mounted on said output shaft for rotation relative thereto and having a gear element in constant mesh with said first gear element, a second gear means supportedly mounted on said input shaft for rotation relative thereto independently of said first gear element, and an axially shiftable clutch element nonrotatably connected with said input shaft intermediate said first gear element and said second gear means and movable from engagement with either said first gear element or said second gear means to a neutral position whereby power may be transmitted to said power take-off means without rotating any of the gear elements on said input or said output shaft.

8. In a self-propelled vehicle including a power unit, a power take-off means, a lubricant confining housing mounting bearings rotatably supporting a transmission input shaft and a transmission output shaft disposed in spaced parallel relation with respect to each other, said input shaft having opposite end portions connected, respectively, in driven relation with said power unit and in driving relation with said power take-off means, change speed gearing operatively interposed between said input and output shafts, said gearing including a gear cluster mounted on each of said shafts for rotation thereon with gear elements of said clusters disposed in constant mesh relation, and including a clutch element positionable to connect said input shaft in power transmitting relation with said output shaft and/or said power take-off means and positionable to terminate all driving connections between said input shaft and said gearing whereby power may be transmitted to said power take-off means without rotating any of the gear elements on said input or said output shaft.

9. In a self-propelled vehicle including a power unit, a power take-off mechanism, a lubricant confining housing mounting bearings rotatably supporting a transmission input shaft and a transmission output shaft disposed in said housing in spaced parallel relation with respect to each other, said input shaft having opposite end portions connected, respectively, in driven relation with said power unit and in driving relation with said power take-off means, change speed gearing operatively interposed between said input and output shafts, said gearing including a gear mounted on each of said shafts for rotation thereon and disposed in constant mesh relation, and including means positionable to connect said input shaft in power transmitting relation with said output shaft and/or said power take-off means and positionable to terminate all driving connections between said input shaft and said gearing whereby power may be transmitted to said power take-off means without rotating any of the gear elements on said input or said output shaft.

10. In a self-propelled vehicle including a power unit, a power take-off mechanism, a lubricant confining housing mounting pairs of aligned bearings rotatably supporting a transmission input shaft and a transmission output shaft disposed in said housing in spaced parallel relation with respect to each other, means for selectively connecting opposite end portions of said input shaft in power receiving and transmitting relation to said power unit and power take-off means, respectively, a change speed gearing selectively controllable to place said input shaft in power transmitting relation with said output shaft comprising a first gear element supportedly mounted on said input shaft for rotation relative thereto, a first gear means supportedly mounted on said output shaft for rotation relative thereto and having a gear element in constant mesh with said first gear element, a second gear means supportedly mounted on said input shaft for rotation relative thereto independently of said first gear element, and an axially shiftable clutch element nonrotatably connected with said input shaft intermediate said first gear element and said second gear means and movable from engagement with either said first gear element or said second gear means to a neutral position whereby power may be transmitted to said power take-off means without rotating any of the gear elements on said input or said output shaft.

LOUIS JACOBI.

REFERENCES CITED

The following references are of record in the file of this patent:

UNITED STATES PATENTS

| Number | Name | Date |
|---|---|---|
| 1,870,969 | Snow | Aug. 9, 1932 |
| 2,072,994 | Wagner | Mar. 9, 1937 |
| 2,084,887 | Bennett | June 2, 1937 |
| 2,220,541 | Peterson | Nov. 5, 1940 |
| 2,317,957 | Frudden | Apr. 27, 1943 |

FOREIGN PATENTS

| Number | Country | Date |
|---|---|---|
| 839,759 | France | Apr. 12, 1939 |